United States Patent [19]

Ostrozynski et al.

[11] 4,155,865

[45] May 22, 1979

[54] CONSTANT BOILING MIXTURES OF 1,1,2,2-TETRAFLUOROETHANE AND 1,1,1,2-TETRAFLUOROCHLOROETHANE

[75] Inventors: Robert L. Ostrozynski, Williamsville; Earl E. A. Lund, West Seneca; Hillel Magid, Williamsville, all of N.Y.

[73] Assignee: Allied Chemical Corporation, Morris Township, Morris County, N.J.

[21] Appl. No.: 864,366

[22] Filed: Dec. 27, 1977

[51] Int. Cl.$^2$ ............................................. C09K 5/04
[52] U.S. Cl. ...................................... 252/67; 252/66; 252/78.1; 252/305; 252/364; 252/DIG. 9
[58] Field of Search .................. 252/67, 66, 78.1, 305, 252/364, DIG. 9

[56] References Cited

U.S. PATENT DOCUMENTS

| | | | |
|---|---|---|---|
| 2,920,112 | 1/1960 | Larsen | 260/653 |
| 2,951,102 | 8/1960 | Larsen et al. | 260/653 |
| 3,085,065 | 4/1963 | Kvalnes | 252/67 |

OTHER PUBLICATIONS

"Oscillographic Study of a Direct-Flow Compressor Operative on Azeotropic Mixtures of Refrigerants", Vodyanitskaya et al., Kholod. Tekh. Tekhnol, 1969, No. 8, 6–9, CA. 72:14193p.

"Properties and Use of Mixtures of Agents in Compression Refrigerating Machines", Chalkovski et al., Kholod, Tekh. Tekhnol, 1972, No. 15, 56–61, CA 79:33043a.

*Primary Examiner*—Harris A. Pitlick
*Attorney, Agent, or Firm*—Jay P. Friedenson

[57] ABSTRACT

Constant boiling mixtures of 1,1,2,2-tetrafluoroethane and 1,1,1,2-tetrafluorochloroethane are useful as refrigerants, heat transfer media, gaseous dielectrics, expansion agents, aerosol propellants, working fluids in a power cycle and solvents, and are potentially environmentally safe.

4 Claims, No Drawings

CONSTANT BOILING MIXTURES OF 1,1,2,2-TETRAFLUOROETHANE AND 1,1,1,2-TETRAFLUOROCHLOROETHANE

BACKGROUND OF THE INVENTION

This invention relates to mixtures of fluorinated hydrocarbons and more particularly to constant boiling fluorocarbon mixtures which comprise 1,1,2,2-tetrafluoroethane and 1,1,1,2-tetrafluorochloroethane. Such mixtures are useful as refrigerants, heat transfer media, gaseous dielectrics, expansion agents, aerosol propellants, working fluids in a power cycle and solvents, and are potentially environmentally safe substitutes for trichlorofluoromethane and dichlorodifluoromethane which are industry standards for refrigerant and aerosol propellant applications.

Recently the long term environmental effects of trichlorofluoromethane and dichlorofluoromethane have come under substantial scientific scrutiny. It has been postulated that these materials break down in the stratosphere under the influence of ultraviolet light to release chlorine atoms which are theorized to undergo chemical reactions in the stratosphere which may lead to depletion of the stratospheric ozone layer which shields the earth from harmful ultraviolet radiation. A substantial reduction in this ozone layer could have a serious impact on the quality of life on earth.

There is a continuing need in this art for new materials having new combinations of properties for use in the various applications mentioned above. In view of the potential environmental problem discussed above, there is a particular need for new materials possessing properties which make them useful in the subject applications, which materials are potentially environmentally safe.

There is a limit to the number of single fluorinated hydrocarbon substances which would be candidates for such environmentally safe materials. Mixtures of known materials, however, might be used if the desired combination of properties can be found in a given mixture. Simple mixtures, however, create problems in design and operation of refrigeration and other equipment because of segregation of the components in the liquid and vapor phases. To avoid such segregation problems it is particularly desirable to discover new azeotropic or constant boiling blends of fluorocarbons. Such blends would not suffer from such segregation problems. Unfortunately, however, azeotropism is an unpredictable phenomenon thus complicating the search for novel azeotropic compositions which possess desirable combinations of properties.

An object of the present invention is to provide a new azeotropic or constant boiling composition of matter comprising fluorocarbon components.

Another object of the invention is to provide new, low boiling azeotropic or constant boiling mixtures which have properties which make them particularly useful as refrigerants and aerosols.

Still another object of the invention is to provide new, low boiling, azeotropic or constant boiling mixtures, useful in producing refrigeration or as aerosol propellants which are potentially environmentally safe.

Other objects of the invention will become apparent from the following description.

DESCRIPTION OF THE INVENTION

In accordance with the present invention, azeotropic or constant boiling mixtures have been discovered which consist essentially of about 95.5 weight percent of 1,1,2,2-tetrafluoroethane and about 4.5 weight percent of 1,1,1,2-tetrafluorochloroethane at 20.0° C.

For the purpose of this discussion, by azeotropic or constant boiling is intended to mean also essentially azeotropic or essentially constant boiling. In other words, included within the meaning of these terms are not only the true azeotrope described above at 20.0° C. but also other compositions containing the same components in different proportions which are true azeotropes at other temperatures and pressures, as well as those equivalent compositions which are part of the same azeotropic system and are azeotrope-like in their properties. As is well recognized in this art, there is a range of compositions containing the same components as the azeotrope which not only will exhibit essentially equivalent properties for refrigeration and other applications, but which will exhibit essentially eqivalent properties to the true azeotropic compositions in terms of constant boiling characteristics or tendency not to segregate or fractionate upon boiling.

The novel azeotropic composition of the invention has a boiling point of $-19.59°$ C./760mm Hg. 1,1,2,2-Tetrafluoroethane has a boiling point of about $-19.52°$ C./760mm. 1,1,1,2-tetrafluorochloroethane has a boiling point of $-12.00°$ C./760mm Hg.

The novel azeotropic mixtures are considered to be potentially and environmentally safe because it is believed that these mixtures will substantially break down in the troposphere and thus not reach the stratosphere where their decomposition could adversely affect the ozone layer.

The novel azeotropic mixtures may be used to produce refrigeration by condensing the mixtures and thereafter evaporating same in the vicinity of a body to be cooled.

The use of the azeotropic mixtures eliminate the problem of segregation and handling in the operation of the systems because of the behavior of azeotropic mixtures essentially as a single substance. The novel azeotropic mixtures also offer the advantage of being substantially non-flammable.

The preferred composition according to the invention is the true azeotrope which consists essentially about 95.5 weight percent of 1,1,2,2-tetrafluoroethane and about 4.5 weight percent of 1,1,1,2-tetrafluorochloroethane at 20° C. A preferred range of equivalent compositions in azeotropic characteristics are those which contain from about 69.1-99.5 weight percent of 1,1,2,2-tetrafluoroethane and about 0.5-30.9 weight percent of 1,1,1,2-tetrafluorochloroethane at 20° C. and, still preferably, from about 93.3-97.3 weight percent of 1,1,2,2-tetrafluoroethane and about 2.7-6.7 weight percent of 1,1,1,2-tetrafluorochloroethane at 20° C.

EXAMPLE 1

A phase study was made on 1,1,2,2-tetrafluoroethane (b.p. $-19.52°$ C./760mm) and 1,1,1,2-tetrafluorochloroethane (b.p. $-12.00°$ C./760mm) wherein the composition was varied and the vapor pressures were measured at a temperature of 20.0° C. An azeotropic composition at 20° C. was obtained at the maximum pressure and was identified as follows:

1,1,2,2-tetrafluoroethane — 95.5 weight percent 1,1,1,2-tetrafluorochloroethane — 4.5 weight percent

EXAMPLE 2

An evaluation of the refrigeration properties of the azeotropic mixtures of the invention and its components are shown in the following Table. The data are generated on a one ton basis, that is to say the removal of heat from a space at the rate of 12,000 BTU/hr.

Table

| Comparison of Refrigeration Performance | | | | |
|---|---|---|---|---|
| | Dichlorofluoromethane | 1,1,2,2-Tetrafluoroethane | 1,1,1,2-Tetrafluoro-Chloroethane | Azeotropic Composition 95.5 weight percent of 1,1,2,2-tetrafluoroethane and 4.5 weight percent of 1,1,1,2-tetrafluorochloroethane |
| Evaporator Temperature (°F.) | −10 | −10 | −10 | −10 |
| Superheating Temperature (°F.) | 60 | 60 | 60 | 60 |
| Condenser Temperature (°F.) | 110 | 110 | 110 | 110 |
| Pressure (psia) | 151.11 | 129.60 | 95.03 | 127.20 |
| Subcooling Temperature (°F.) | 90 | 90 | 90 | 90 |
| Coefficient of Performance | 3.056 | 3.124 | 3.130 | 3.100 |
| Net Refrigeration Effect (BTU/lb) | — | — | — | 71.70 |
| Displacement (ft³/min/ton) | 8.11 | 10.91 | 15.47 | 11.10 |

By net refrigeration effect is intended to mean the change in enthalpy of the refrigerant in the evaporator or, in other words, the heat removed by the refrigerant in the evaporator.

By coefficient of performance is intended to mean the ratio of the net refrigeration effect to the compressor work. It is a measure of the efficiency of the refrigerant.

For a refrigeration cycle typified by the above conditions the displacement of the novel azeotropic composition is 11.10. This represents a decrease of 7.9% over the displacement value anticipated if both components behave as a physical blend. A lower displacement means at the same cooling effect can be produced with less circulation of the refrigerant vapor.

Additives such as lubricants, corrosion inhibitors, stabilizers and others may be added to novel compositions of the invention for variety of purposes provided that they do not have an adverse influence on the compositions for their intended applications.

In addition to refrigerant and aerosol applications, the novel constant boiling compositions of the invention are also useful as heat transfer media, gaseous dielectrics, expansion agents such as for polyolefins and polyurethanes, working fluids in power cycles and as solvents.

We claim:

1. Constant boiling mixtures consisting essentially of about 69.1-99.5 weight percent of 1,1,2,2-tetrafluoroethane and about 0.5-30.9 weight percent of 1,1,1,2-tetrafluorochloroethane.

2. Constant boiling mixtures according to claim 1 consisting essentially of about 93.3-97.3 weight percent of 1,1,2,2-tetrafluoroethane and about 2.7-6.7 weight percent of 1,1,1,2-tetrafluorochloroethane.

3. The process of producing refrigeration which comprises condensing a constant boiling mixture as described in claim 1 and thereafter evaporating said mixture in the vicinity of a body to be cooled.

4. The process of producing refrigeration according to claim 3 in which the constant boiling mixture condensed and evaporated is as defined in claim 2.

* * * * *